(12) United States Patent
McCarthy

(10) Patent No.: US 9,009,598 B2
(45) Date of Patent: Apr. 14, 2015

(54) INTERACTIVE SERVICES

(75) Inventor: Stuart J. McCarthy, Middlesex (GB)

(73) Assignee: British Sky Broadcasting Ltd., Middlesex (GB)

( * ) Notice: Subject to any disclaimer, the term of this patent is extended or adjusted under 35 U.S.C. 154(b) by 954 days.

(21) Appl. No.: 12/531,630

(22) PCT Filed: Mar. 17, 2008

(86) PCT No.: PCT/GB2008/000927
§ 371 (c)(1),
(2), (4) Date: Nov. 11, 2010

(87) PCT Pub. No.: WO2008/113991
PCT Pub. Date: Sep. 25, 2008

(65) Prior Publication Data
US 2011/0047464 A1    Feb. 24, 2011

(30) Foreign Application Priority Data

Mar. 16, 2007    (EP) ..................... 07251123

(51) Int. Cl.
G06F 3/00 (2006.01)
G07F 17/32 (2006.01)
H04L 12/18 (2006.01)
H04L 29/06 (2006.01)

(52) U.S. Cl.
CPC ........ *G07F 17/3223* (2013.01); *G07F 17/3276* (2013.01); *H04L 12/185* (2013.01); *H04L 67/38* (2013.01); *A63F 2300/409* (2013.01); *A63F 2300/558* (2013.01)

(58) Field of Classification Search
CPC ..................................................... H04L 67/38
USPC ................................. 715/781, 733, 217, 720
See application file for complete search history.

(56) References Cited

U.S. PATENT DOCUMENTS

| | | | |
|---|---|---|---|
| 6,674,448 B1 * | 1/2004 | Marshall et al. | 715/719 |
| 6,848,997 B1 * | 2/2005 | Hashimoto et al. | 463/42 |
| 8,164,595 B2 * | 4/2012 | Yabuki et al. | 345/440 |
| 8,538,910 B2 * | 9/2013 | Minka et al. | 706/61 |
| 2006/0040717 A1 * | 2/2006 | Lind et al. | 463/7 |
| 2006/0068917 A1 * | 3/2006 | Snoddy et al. | 463/42 |
| 2006/0241795 A1 * | 10/2006 | Weingardt et al. | 700/91 |
| 2007/0191102 A1 * | 8/2007 | Coliz et al. | 463/42 |
| 2007/0259709 A1 * | 11/2007 | Kelly et al. | 463/20 |
| 2007/0288864 A1 * | 12/2007 | Keereepart et al. | 715/790 |
| 2008/0141326 A1 * | 6/2008 | Thompson et al. | 725/118 |
| 2008/0254883 A1 * | 10/2008 | Patel et al. | 463/31 |
| 2009/0131175 A1 * | 5/2009 | Kelly et al. | 463/42 |
| 2009/0187834 A1 * | 7/2009 | Rapo et al. | 715/758 |
| 2009/0276691 A1 * | 11/2009 | Galuten | 715/217 |
| 2010/0138775 A1 * | 6/2010 | Kohen et al. | 715/781 |
| 2011/0107220 A1 * | 5/2011 | Perlman | 715/720 |
| 2011/0124417 A1 * | 5/2011 | Baynes et al. | 463/43 |
| 2012/0064965 A1 * | 3/2012 | Kelly et al. | 463/25 |

FOREIGN PATENT DOCUMENTS

WO    WO 94/14283 A1    6/1994
WO    WO 03/047710 A3    6/2003

* cited by examiner

*Primary Examiner* — William Titcomb
(74) *Attorney, Agent, or Firm* — Kilpatrick Townsend & Stockton LLP

(57) ABSTRACT

A plurality of users participate (S1) in an interactive service. A subset of the users is determined (S2) according to the outcomes of the participation. The subset is then displayed in a further participation with the interactive service, within a broadcast.

22 Claims, 5 Drawing Sheets

| players | G1 | G2 | G3 | G4 | G5 |
|---|---|---|---|---|---|
| P1 | W | W | L | W | W |
| P2 | W | L | L | L | L |
| P3 | L | W | W | L | W |
| P4 | W | W | L | L | W |
| P5 |   | W | L | L | L |
| P6 |   |   |   | L | W |

| position | G1 | G2 | G3 | G4 | G5 |
|---|---|---|---|---|---|
| 1st | P1 | P1 | P3 | P1 | P1 |
| 2nd | P2 | P4 | P4 | P4 | P4 |
| 3rd | P4 | P3 | P5 | P5 | P6 |
| 4th | P3 | P5 | P2 | P2 | P3 |
| 5th |   | P2 | P1 | P6 | P5 |
| 6th |   |   |   | P3 | P2 |

| players | G1 | G2 | G3 | G4 | G5 |
|---|---|---|---|---|---|
| P1 | W | W | L | W | W |
| P2 | W | L | L | L | L |
| P3 | L | W | W | L | W |
| P4 | W | W | L | L | W |
| P5 |   | W | L | L | L |
| P6 |   |   |   | L | W |

| position | G1 | G2 | G3 | G4 | G5 |
|---|---|---|---|---|---|
| 1st | P1 | P1 | P3 | P1 | P1 |
| 2nd | P2 | P4 | P4 | P4 | P4 |
| 3rd | P4 | P3 | P5 | P5 | P6 |
| 4th | P3 | P5 | P2 | P2 | P3 |
| 5th |   | P2 | P1 | P6 | P5 |
| 6th |   |   |   | P3 | P2 |

INTERACTIVE SERVICES

FIELD OF THE INVENTION

The present invention relates to interactive services.

BACKGROUND OF THE INVENTION

One example of an interactive service is the Sky Active™ service provided by the applicants. Aspects of an interactive application platform are described in the applicant's patent publication WO 97/23997A1. Interactive services may also be provided online over the Internet, for example via the applicant's Sky Anytime™ services, either on mobile or PC.

Recently, online gaming has become very popular, in particular online gambling; in order to promote online gaming, various broadcast programmes have been devised in which online gaming winners qualify to participate in a live broadcast of a gaming session. However, such live broadcasts cease to be interactive for those who have not qualified to participate. On the other hand, the number of participants in a broadcast gaming session is effectively limited to one or a few games at any one time.

STATEMENT OF THE INVENTION

According to one aspect of the present invention, there is provided a method according to claim 1. The present invention extends to apparatus and/or a computer program for performing the method.

According to another aspect of the invention, there is provided a method of operating a series of games, comprising:
 a. providing games to a plurality of players;
 b. determining outcomes of the games for the players;
 c. selecting a subset of the players on the basis of the outcomes; and
 d. providing a game involving the subset of the players.

Preferably, step b comprises determining a ladder between said users, and step c comprises selecting the subset on the basis of the ladder.

Preferably, said players are divided into a plurality of ladders, step b comprises determining a relative ranking within each ladder, and step c comprises selecting the subset from each ladder on the basis of the ranking within that ladder.

Preferably, the method is performed iteratively so that the subset of the players changes after the game involving the subset of the players.

BRIEF DESCRIPTION OF THE DRAWINGS

Specific embodiments of the present invention will now be described with reference to the accompanying drawings, in which.

DETAILED DESCRIPTION OF EMBODIMENTS OF THE INVENTION

Network Architecture

Figure 1:
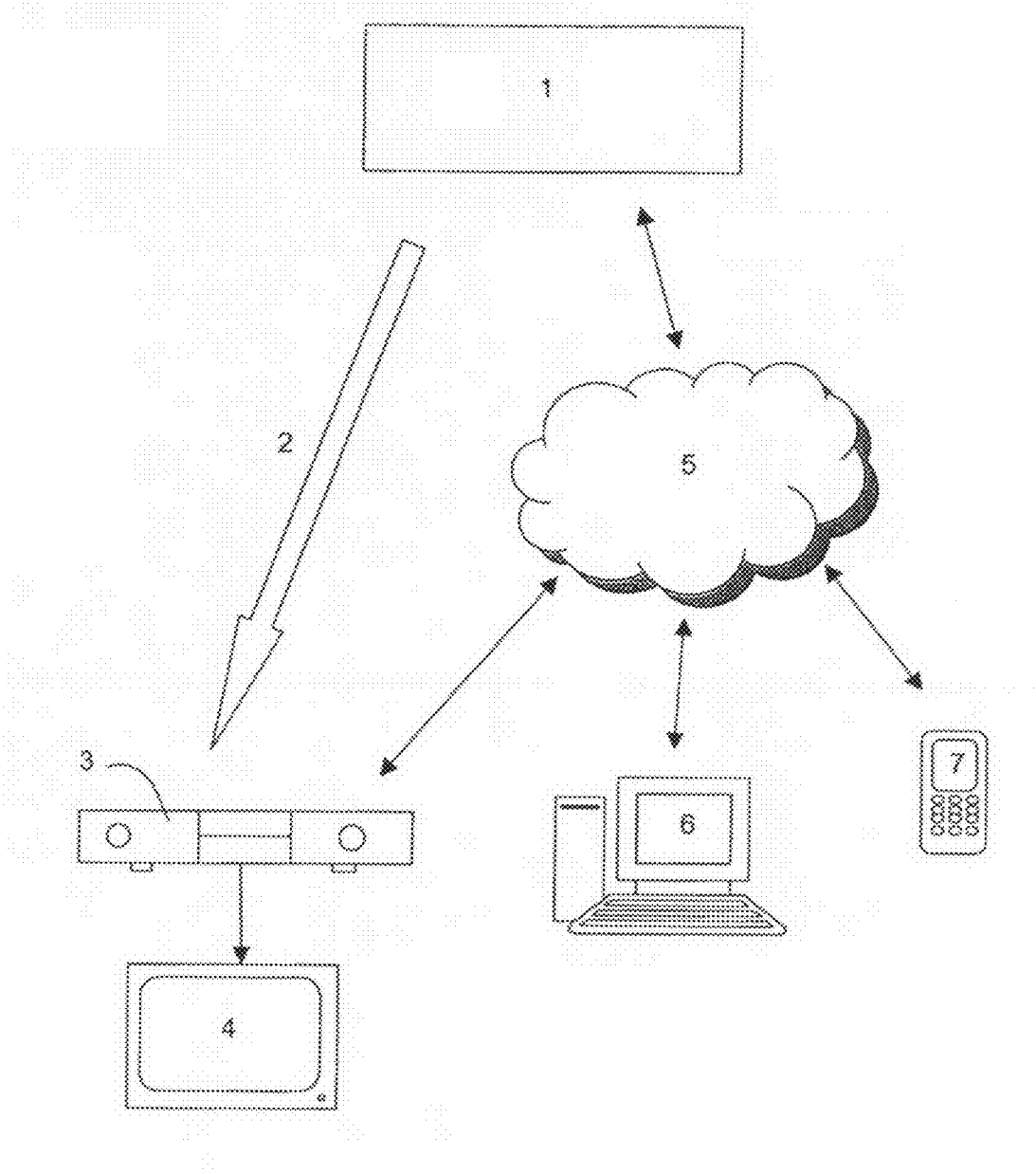
FIG. 1 is a diagram of a network architecture suitable for use in embodiments of the invention.

FIG. 1 shows a simplified network architecture for an interactive service in an embodiment of the invention. An interactive broadcast headend 1 acts as a server for the interactive broadcast service, for example by means of a computer programme executed by the headend 1.

The headend 1 generates a broadcast stream 2 carrying an interactive broadcast, such an interactive broadcast programme. The broadcast stream 2 is received over a broadcast network and decoded by a set-top box 3 connected to a television 4 or other video display, for displaying the interactive broadcast. The set-top box 3 is connected to the headend 1 through a network 5, such as the Internet, thereby enabling interactive communication with the headend 1 by means of an interactive application.

Interactive communication with the headend 1 is also provided to a computer 6 and/or to a mobile terminal 7, each of which runs an interactive application for communication with the interactive service at the headend 1. The computer 6 may be connected to the headend 1 via the network 5, or another network (not shown). The mobile terminal 7 is connected via a mobile network (not shown) and via the network 5, or another network, to the headend.

The computer 6 and/or the mobile terminal 7 may be able to receive the broadcast stream 2 via the network 5, or another network.

It is of course envisaged that a large number, possibly millions, of set-top boxes 3, computers 6 and/or mobile terminals 7 are connectable concurrently to the headend 1.

Moreover, the above architecture is provided only as an example, and other architectures may be applied in embodiments of the invention.

Method of Operation

Figures 2, 3, 4:
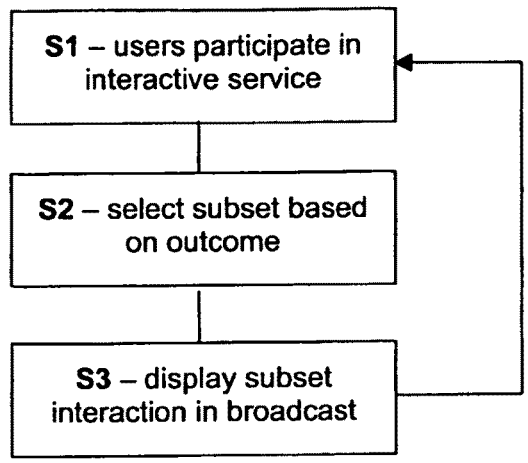
FIG. 2 is a flow chart of method performed by an interactive service in an embodiment of the invention.
FIG. 3 is a table illustrating an example of the outcome of a series of games provided by the interactive service.
FIG. 4 is a table illustrating the ranking of players in a ladder pertaining to the games.

As shown in FIG. 2, in an interactive service according to an embodiment of the present invention, a large number of users participate (S1) in the interactive service concurrently, each via an interactive application. A subset of those participants is selected (S2) to be represented in the broadcast stream (S3). The subset is continuously varied according to the participation in the interactive service. Hence, each participant continues to have the opportunity to participate in the broadcast, according to their interaction with the interactive service. The broadcast stream may represent the interaction with the interactive service of participants within the subset.

Ranking

Preferably, the interactive service involves a series of games, competitions or other interactions (hereafter referred to collectively as 'games'). The outcome of each game determines the ranking of one or more participants involved in that game. The current highest ranking participants are selected to participate in a game or competition that is represented in the broadcast. At the end of the broadcast game, at least some of the previously selected participants may be deselected on the basis of the outcome of the broadcast game. The deselected participants may be replaced by other participants, preferably by the new highest ranking participants following one or more games that are not broadcast.

Preferably, the broadcast game may involve a predetermined number of participants, each selected from a corresponding ladder. The highest ranking participant from each ladder may be selected for the broadcast game. The rankings within each ladder may be continuously amended by the outcome of a series of games by participants within that ladder.

One example of a ranking algorithm is illustrated in FIGS. 3 and 4. A plurality of players P1 to P5 participate in a series of games G1 to G5. In each game, the player P plays a game in which the outcome is either a win (W) or a loss (L), independently of the outcome for any other player. The outcomes in this example are shown in FIG. 3; player P5 enters only at game G2, while player P6 enters at game G4.

The relative rankings of each player after each game G1 to G5 are shown in FIG. 4. If a player P wins in a particular game G, that player P moves up above all other players P that have lost that game. The relative rankings among winners and losers are maintained. Players joining the ladder start at the bottom; hence player P5 starts game G2 at the bottom ($5^{th}$), but wins game G2 and so is $4^{th}$ at the end of game G2, ahead of player P2 who lost.

Broadcast Selection

Figure 5:
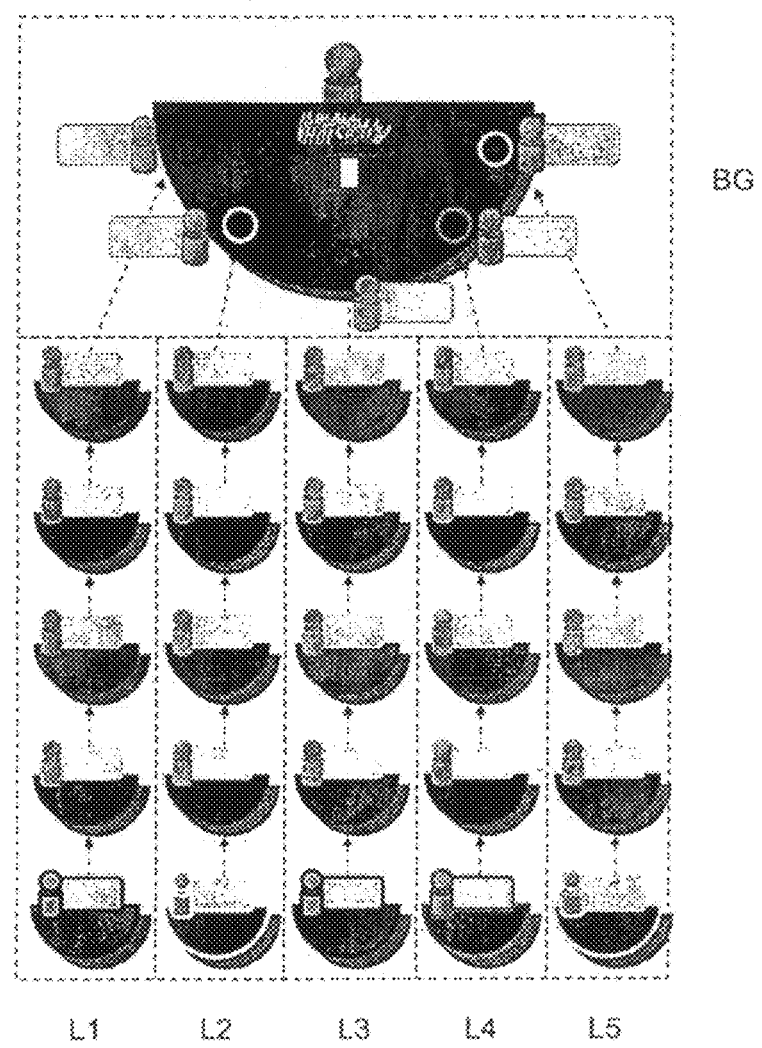
FIG. 5 is a schematic diagram of the selection of players for a broadcast game.

As shown in FIG. 5, players are arranged in a plurality of ladders L1 to L5, with the order of each player within the ladder being determined as above. The highest ranking player in each ladder is selected to play in a broadcast group BG. The game played by the broadcast group BG is broadcast within the broadcast stream 2.

Each player P, when entering the interactive service, selects one of the ladders L1 to L5 in which to play. Whenever a player P ends a game at the top of the selected ladder L, that player joins the broadcast group BG. The player P continues to play within the broadcast group BG until that player P loses, at which point that player moves down the selected ladder L, preferably to the bottom of the ladder L. The new highest ranking player P within that ladder L then enters the broadcast group BG. Preferably, games G within the ladders L are synchronised with games within the broadcast group BG.

Jackpot

A separate jackpot may be defined for each ladder L. All players P within a ladder L contribute to the jackpot for that ladder, for example by contributing a stake for each game G. After each game G, the jackpot may be split between the player P within the broadcast group BG and the remaining players P within the ladder. Optionally, only those players that have won a particular game G win a share of the jackpot.

Ladder Information

Information about the outcome of games G played outside the broadcast group BG may also be included within the broadcast, although details of the interactions within those games G are not included.

Figure 6A:
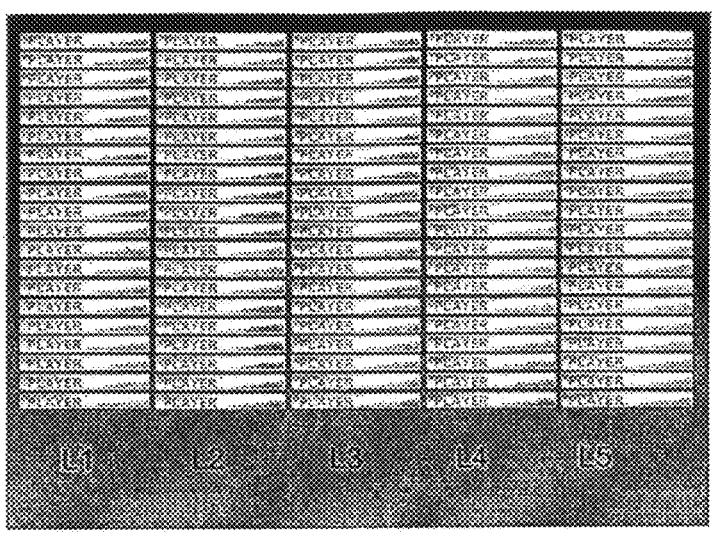
FIGS. 6a to 6c show formats for representing the outcome of games in each ladder.
Figure 6B:
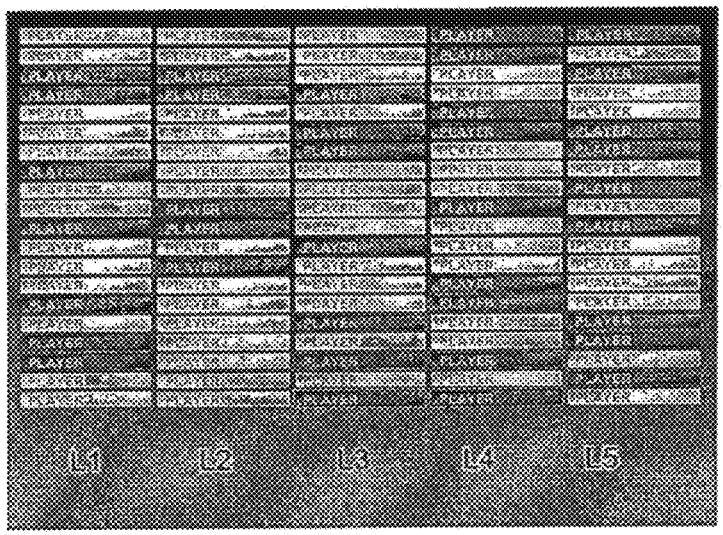
Figure 6C:
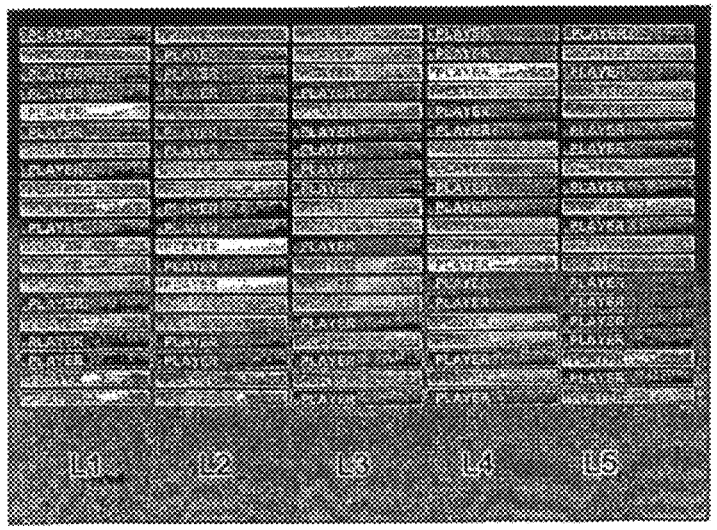

The information may be represented in a format shown in FIGS. 6a to 6c, with rectangular boxes each representing an individual player P within all the ladders L1 to L5. FIG. 6a shows the format at the beginning of a game G: all boxes have the same format, such as a neutral colour. As the game G is played, the format of each box changes according to the outcome of the game for the corresponding player P. For example, if a player P loses, the corresponding box turns red; if the player wins, the box may turn green, or gold if the win is particularly good (e.g. a blackjack). These changes appear as the outcomes are determined. At the end of the game G, the positions of the boxes change according to the new rankings of the players P. Jackpot amounts may also be shown for each ladder L.

Broadcast Group Game play

One specific embodiment of the invention involves an interactive Blackjack game. The broadcast game within the broadcast group BG proceeds as follows. All players play at once against a single 60 second clock.

The order of play is as follows:
1. Cards are dealt starting from position 1 (corresponding to ladder L1).
2. Each player can only play one hand.
3. Players may not split.
4. The game clock starts when the last player's cards are dealt.
5. All players have 60 seconds to make their decisions (stand, hit, fold or split); if they fail to act in this time they automatically stand.
6. During the game play a dealer/presenter comments on the play on the table.
7. When the clock reaches 60 seconds, the betting window closes.
8. The dealer takes another card and plays out the hand to the rules of Blackjack.
9. Winners are then paid and losers leave the table
10. The dealer welcomes the new players to the table and the play begins again at step 1 above.

Ladder Game Play

The game play on the ladders L allows for players P to play multiple hands in the same 60 second window as players in the broadcast group BG. The player's first hand is their qualifying hand and determines their ladder position.

The order of play within one of the ladders L is as follows:
1. Each player chooses their stake, number of hands and selects deal (cards will be dealt at the same time as the broadcast group (BG))
2. The play window of 60 seconds then starts.
3. Game play is as standard European Blackjack with the exception that players may not split their cards.
4. Players may start playing the moment their cards are dealt.
5. All players have 60 seconds to make their decisions (stand, hit or fold); if they fail to act in this time they automatically stand.
6. Players may play multiple hands within the betting window; once players have completed one hand (by going bust, standing or doubling) they continue on to the next hand; if they do not make an action on any of their hands they will be considered to have stood on the cards dealt to them.
7. When the on-screen clock reaches 60 seconds, the play window closes.
8. The dealer then takes a second card and any further required cards, playing out the hand to the rules of blackjack.
9. Winners are then paid.
10. Ladder positions are adjusted, including any players entering or leaving the broadcast group BG. Play then continues from step 1 above.

Interactive Broadcast Application

Figure 7:
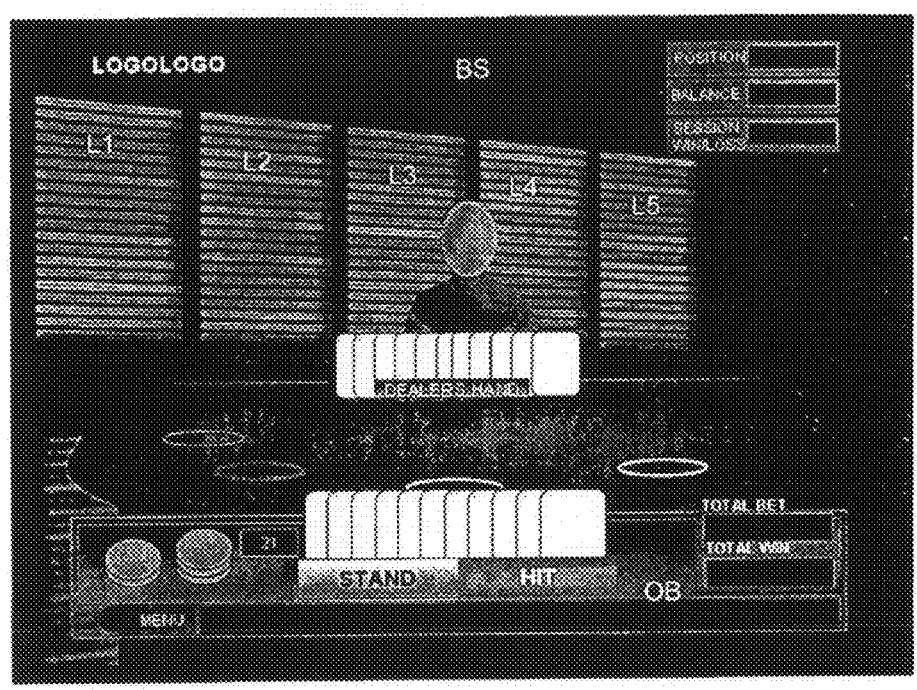
FIG. 7 shows an interactive broadcast application screen display.

FIG. 7 shows an example of an interactive broadcast application screen display, such as may be displayed by the set-top box 3 on the screen 4. The screen display comprises a broadcast screen BS containing live content broadcast over the broadcast stream 2; the live content represents the game play within the broadcast group BG, together with the outcomes of the game play within the ladders L. Interactive content is displayed on an overlay bar OB, overlaid on the broadcast screen BS, which represents game play by the player P using the set-top box 3. Hence, the overlay bar OB represents a different game from the broadcast screen BS, unless the player P is within the Broadcast Group BG.

The overlay bar OB includes buttons that allow the player to set the stake, and stand or hit. The player's current position, balance and the outcome of the current game is also overlaid on the broadcast screen.

Online Application

Figure 8:
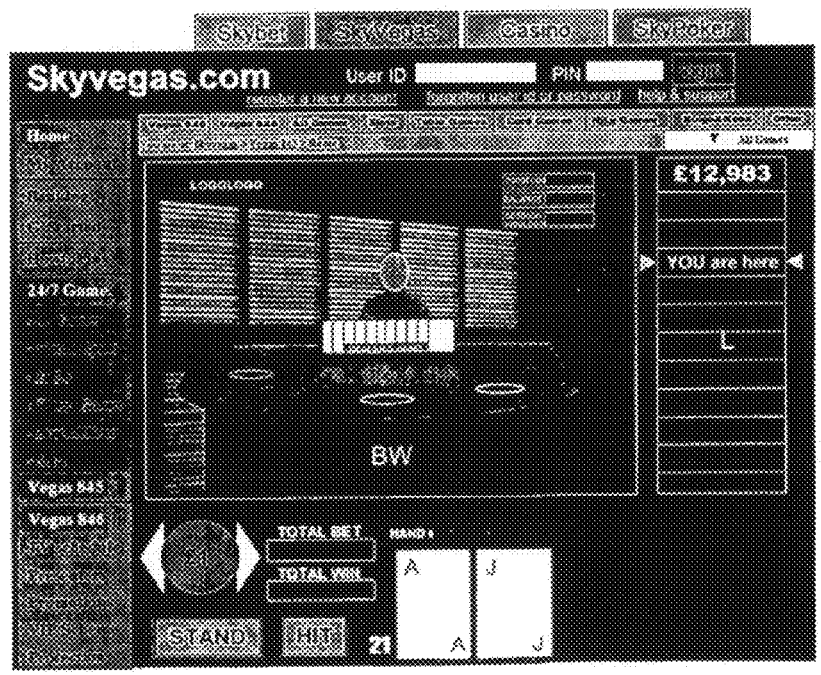
FIG. 8 shows an online application screen display.

FIG. 8 shows an example of an online application screen display, such as may be displayed by the computer 6 or mobile terminal 7. The broadcast stream 2 is displayed in a broadcast window BW within a web page as shown in FIG. 8, which includes the functions of the overlay bar OB of FIG. 7.

Additionally, the ranking of the player P within the player's ladder L is displayed, together with the jackpot for that ladder. When the player P reaches the top of the ladder L, the display may change to indicate the player's status within the broadcast group BG.

Additionally, the player P may play multiple hands by selecting tabs for the different hands. As the player P makes a betting decision for one hand, the display moves automatically to the tab for the next unplayed hand.

Additional Rules

Additional examples of game play rules in embodiments of the invention are set out below.

Ladder Rules
In order to maintain their position on the ladder L the player P must keep playing; if the player misses a round of betting, they will move to the bottom of the ladder.
The player P not in the broadcast group BG may play multiple hands; however only hand 1 (the first hand dealt) will affect their ladder position.
A player who has not staked will go to the very bottom of the ladder; a losing player from the broadcast group BG will be positioned above any player that has not staked, as they are deemed to be active.
Split
Players in the broadcast group BG may be prevented from splitting. Splitting allows players to play more than one hand, thus staying in the broadcast group for longer and delaying the opportunity for players behind them in the ladder.
Progressive Jackpot
A progressive jackpot may be awarded for multiple or suited Blackjacks (e.g. AJ spades) whilst in the broadcast group BG.
When a player wins the progressive jackpot, all players P playing on the same ladder at the time may benefit. The pot will be split 50/50 with 50% being awarded to the player and the remaining 50% is then distributed equally among the active hands in the ladder, regardless of whether the hand has bust.
Multiple Pots & Choosing Positions
Each position in the broadcast group BG has an assigned progressive jackpot contributed to by all of the players on the relevant ladder.

On entering the game, the players will be shown the progressive jackpots and number of players on each ladder and given the option to choose which ladder they wish to join. This may help players who want to get onto the broadcast group BG more frequently as those players seeking a larger potential progressive payout are likely to join the ladder with the highest advertised pot, thus creating a fast track.
Players may also elect to stop playing in one ladder and join another.

Alternative Embodiments

An embodiment has been described above with reference to a competition or game, such as Blackjack. However, it will be apparent that aspects of the invention are applicable to other interactive applications. For example, the game G may be a quiz game, with players P being asked questions, and their position on the ladder being affected by whether they get an answer right or wrong. The players P may have live webcams, so that live images of the players within the broadcast group BG may automatically be included within the broadcast stream 2.

Alternative embodiments, which nevertheless fall within the scope of the present invention, may be apparent on reading the above description.

The invention claimed is:

1. A method of operating an interactive gaming, service, comprising:
   a. providing an interactive gaming service to a plurality of users;
   b. determining outcomes of the interactive gaming service for the users, wherein the determined outcomes include win and loss outcomes;
   c. selecting a subset of the users to participate in a broadcast game session of the interactive gaming service, wherein the subset of users is selected on the basis of the outcomes;
   d. providing a live broadcast stream representing the interaction of the selected subset of users within the broadcast game session, wherein the live broadcast stream is viewable by users other than the selected subset of users; and
   e. continuously varying the subset of users within the broadcast game session, wherein at least one user within the broadcast game session is replaced with a respective new selected user after the at least one user ends a game with a loss outcome, the respective new selected user being selected from the plurality of users on the basis of the determined outcomes of the interactive gaming service.

2. The method of claim 1, further comprising receiving the live broadcast stream at a set top box receiver for output to a display.

3. The method of claim 1, wherein the interactive gaming service is provided to a plurality of users as an interactive program in a broadcast stream received by a respective plurality of set-top boxes, wherein each user interacts with the interactive gaming service in a respective interactive gaming service session via a received interactive program.

4. The method of claim 1, wherein step b comprises determining a relative ranking between ones of said users, and step c comprises selecting the subset on the basis of the ranking.

5. The method of claim 4, wherein said users are divided into a plurality of subgroups, step b comprises determining a relative ranking within each subgroup, and step c comprises selecting the subset from users within each said subgroup on the basis of the ranking within that subgroup.

6. The method of claim 5, further comprising positioning a user at a lowest ranking when the user misses an action that is prompted by the interactive service.

7. The method of claim 5, wherein the users in each of said plurality of subgroups participate in a respective one of a plurality of interactive service sessions, and wherein the plurality of interactive service sessions are synchronized with the broadcast interactive service session.

8. The method of claim 1, wherein said live broadcast stream and said interactive service are provided concurrently to at least some of said users.

9. The method of claim 8, wherein said interactive service is provided via an interactive display including a display of said live broadcast stream.

10. The method of claim 1, further including providing a display of the outcomes of the interactive service for the users.

11. The method of claim 10, wherein said display of the outcomes is provided within the live broadcast stream.

12. The method of claim 10, wherein the display is changed to indicate a user's status within the selected subset of users.

13. The method of claim 10, wherein the display includes information about the outcome of interactive gaming services outside the broadcast game.

14. An apparatus comprising:
a broadcast headend that provides an interactive gaming service to a plurality of users, determines outcomes of the interactive gaming service for the users, selects a subset of the users to participate in a broadcast game session of the interactive gaming service on the basis of the outcomes, and generates a live broadcast stream representing the interaction of the selected subset of users with the broadcast game session, wherein the live broadcast stream is viewable by users other than the selected subset of users; and
an interactive network connection that receives interactive communications from one of the users over a network;
wherein the determined outcomes include win and loss outcomes, and wherein at least one user within the broadcast game session is replaced with a respective new selected user after the at least one user ends a game with a loss outcome, the respective new selected user being selected from the plurality of users on the basis of the determined outcomes.

15. The apparatus of claim 14, wherein the broadcast headend determines a relative ranking between ones of said users, and selects the subset on the basis of the ranking.

16. The apparatus of claim 15, wherein said users are divided into a plurality of subgroups, the broadcast headend determines a relative ranking within each subgroup, and selects the subset from users within each said subgroup on the basis of the ranking within that subgroup.

17. An interactive service terminal of a user, the interactive service terminal comprising:
a processor that executes an interactive application; and
network communications means for interactive communication in accordance with the interactive application with a server that provides an interactive service session to a plurality of users, determines outcomes of the interactive gaming service session for the users, selects a subset of the users to participate in a broadcast game session of the interactive gaming service on the basis of the outcomes, and generates a live broadcast stream representing the interaction of the selected subset of users with the broadcast game session, wherein the live broadcast stream is viewable by users other than the selected subset of users;
wherein the determined outcomes include win and loss outcomes, and wherein at least one user within the broadcast game session is replaced with a respective new selected user after the at least one user ends a game with a loss outcome, the respective new selected user being selected from the plurality of users on the basis of the determined outcomes.

18. The interactive service terminal of claim 17, wherein the server determines a relative ranking between ones of said users, and selects the subset on the basis of the ranking.

19. The interactive service terminal of claim 18, wherein said users are divided into a plurality of subgroups, the server determines a relative ranking within each subgroup, and selects the subset from users within each said subgroup on the basis of the ranking within that subgroup.

20. A computer program product comprising a non-transitory computer readable medium having program code for execution by a headend apparatus to perform a method comprising:
a. providing an interactive gaming service to a plurality of users;
b. determining outcomes of the interactive gaming service for the users, wherein the determined outcomes include win and loss outcomes;
c. selecting a subset of the users to participate in a broadcast game session of the interactive gaming service, wherein the subset of users is selected on the basis of the outcomes;
d. providing a live broadcast stream representing the interaction of the selected subset of users within a broadcast game session, wherein the live broadcast stream is viewable by users other than the selected subset of users; and
e. continuously varying the subset of users within the broadcast game session, wherein at least one user within the broadcast game session is replaced with a respective new selected user after the at least one user ends a game with a loss outcome, the respective new selected user being selected from the plurality of users on the basis of the determined outcomes of the interactive gaming service.

21. The computer program product of claim 20, wherein step b comprises determining a relative ranking between ones of said users, and step c comprises selecting the subset on the basis of the ranking.

22. The program product of claim 21, wherein said users are divided into a plurality of subgroups, step b comprises determining a relative ranking within each subgroup, and step c comprises selecting the subset from users within each said subgroup on the basis of the ranking within that subgroup.

* * * * *